INVENTORS
GIULIO NATTA
GINO DALL' ASTA
GIORGIO MAZZANTI
BY PATRICIA Q. PEAKE BERTRAM BRADLEY
AND James V. Tura
ATTORNEYS 3,458,489
HOMOPOLYMERS OF CYCLOPENTENE AND
PROCESSES FOR PREPARING THE SAME
Giulio Natta, Gino Dall'Asta, and Giorgio Mazzanti,
Milan, Italy, assignors to Montecatini Edison S.p.A.,
Milan, Italy
Filed Jan. 22, 1964, Ser. No. 339,455
Claims priority, application Italy, Apr. 10, 1963,
7,421/63
Int. Cl. C08f 5/00
U.S. Cl. 260—93.1                      19 Claims

ABSTRACT OF THE DISCLOSURE

Provides high molecular weight, stereoregular homopolymers of cyclopentene which are pentenamers in which the double bonds have essentially cis, or essentially trans, structure. The homopolymers are obtained by polymerizing the cyclopentene in contact with a catalyst prepared from organometallic compounds or hydrides of aluminum, beryllium, or lithium, and compounds of titanium, zirconium, molybdenum or tungsten.

---

Figure 1:
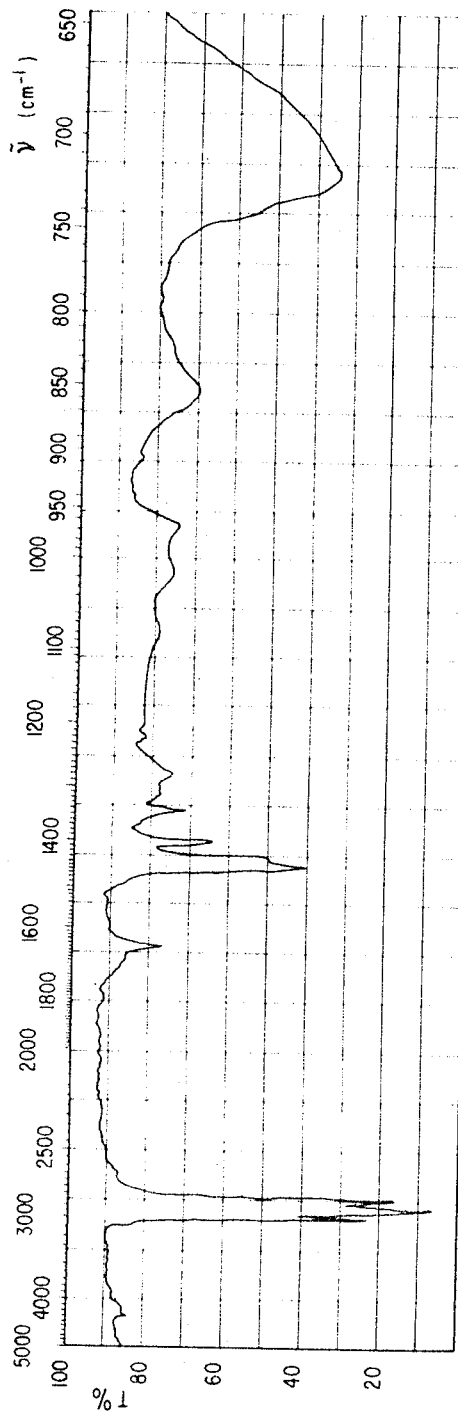

In U.S. Patent No. 3,385,840 issued May 28, 1968, and in application Ser. No. 282,166 filed May 21, 1963 (now abandoned) copolymers of cycloolefins or alkyl cycloolefins with ethylene and ethylene-alphaolefin-cycloolefin terpolymers have been described. These polymers have been characterized, however, by the fact that in the presence of a catalyst e.g. vanadium compound and aluminum alkyl, the cycloolefins or the alkyl cycloolefins copolymerize by opening their double bonds and thus maintain their cyclic structure. The monomers are present in the copolymer in the form of cycloalkylenic units and are, therefore, free of any olefinic double bonds. The terpolymers on the other hand, contain a small amount of unsaturation due to the opening of only a little fraction of the cycloolefin ring during the polymerization. In addition, because of difficulties caused by steric hindrance, the cycloolefins and alkyl substituted cycloolefins, having at least five carbon atoms in the ring, cannot be enchained with each other to form sequences of cycloalkylenic groups. Thus, because of this difficulty it was thought to be impossible to obtain homopolymers from the above-mentioned cycloolefins or alkyl substituted cycloolefins.

However, it has now been discovered, quite unexpectedly, that cyclopentene can be homopolymerized by completely opening the ring and maintaining the olefin double bond of the monomer. The polymerization of cyclopentene, by opening the cycloolefin ring, can be carried out under such moderate temperatures that a thermo and thus sterically disordered decomposition of the cycloolefinic ring can be avoided. Accordingly, it was found that the monomeric units in the homopolymers were substantially in the form of pentenylenic units. These units, which make up the homopolymer, correspond to a structure which can be characterized by the following general formulae:

(1) 

and likewise (2) 

These monomeric units are bound to one another in a manner which is generally referred to as head-to-tail enchainments. Polymers consisting essentially of monomeric units having this type of structure are referred to as polypentenamers in accordance with the nomenclature proposed by M. L. Huggins, Journal of Polymer Science 8, (1952) page 257.

When considering the stability of the five carbon-atom rings and the ease with which they copolymerize with ethylene and maintain their cyclic structure, it was quite surprising to find that cyclopentene will open its ring instead of its double bond. Moreover, it was not known, nor could it be foreseen, that the cyclopentene rings could be opened in a stereospecific manner so as to obtain a polymer having double bonds essentially with a cis or a trans structure. Thus, it has been discovered that by selecting a specific catalytic system and by operating under particular procedural conditions it is possible to prepare cyclopentene homopolymers wherein substantially all of the double bonds have a cis structure or other homopolymers in which substantially all the double bonds have a trans structure. These homopolymers can be defined as polymers having an essentially stereoregular structure. The number of cis or trans double bonds in the polypentenamers wherein described can be determined, if not otherwise indicated, by means of an infrared absorption spectra using the co-efficients indicated by authors D. Morero, A. Santambrogio, L. Porri and F. Ciampelli, Chim. e Industria (Milan) 41, 758 (1959) titled "For the Determination of Double Bonds of Polybutadienes." The value for the percentage of cis or trans double bonds in the polypentenamers herein described can be different for the same polymer when the determination is made by other methods. Thus, by determining the trans-unsaturations (in our polymers having essentially the structure of a trans-polypentenamer) of the infrared absorption spectrum band at 10.35 microns, using $CS_2$ solutions and the absorption coefficient of $$15.2 \times 10^4 \text{ moles}^{-1} \times \text{cm.}^{-1} \times \text{ml.}$$

the values obtained for the proportion of total double bonds having trans structure is over 80% and in some cases as high as 98%, depending on the transition metal salt used as catalyst-forming component as it is selected from among the salts of titanium, zirconium, molybdenum and tungsten as disclosed herein. The value for the percentage of cis double bonds in our polymers having essentially the structure of a cis-polypentenamer obtained by determining the cis-unsaturation of the infrared spectrum band at 7.11 microns, using $CCl_4$ solutions and the absorption coefficient 0.84. $10^4$ moles$^{-1} \times$ cm.$^{-1} \times$ ml. is over 90%, usually 95 to 98%.

Accordingly, it is an object of this invention to provide high-molecular weight linear stereoregular homopolymers of cyclopentene. These homopolymers can be characterized as having a substantially linear structure and by the presence of olefinic unsaturations.

It is another object of this invention to provide a process of preparing high-molecular weight linear stereoregular homopolymers of cyclopentene by polymerizing the cyclopentene in the presence of a specific catalytic system. It is still another object of this invention to provide a method of isolating said homopolymer from the reaction mixture and to further provide a method of purifying the isolated polymer.

It is still a further object of this invention to provide new high-molecular weight homopolymers of cyclopentene which by reason of their chemical and physical properties have various technical and commercial applications.

These and other objects of the invention will become apparent from a further and more detailed description to follow.

The homopolymers of this invention are generally elastic or fibrous solids and are rarely in the tacky or waxy form. In the latter case, they are generally polymers having a low molecular weight. The preferred polymers have molecular weights in excess of several thousand and may exceed several hundred thousands. The intrinsic viscosity of these homopolymers, as determined in toluene, may range between 0.3 and 6.0 (100 cc./gram.) In many instances, however, the intrinsic viscosity of the homopolymers may be outside of this range.

The homopolymers including those having double bonds essentially all trans as well as those having double bonds essentially all cis, are soluble in various solvents. These solvents include, for example, the aromatics, e.g. benzene or toluene, the aliphatic or naphthenic e.g. n-heptane or decaline, the chlorinated hydrocarbons e.g. chloroform or carbon tetrachloride and various other known solvents. However, in those instances where the cyclopentene homopolymers have essentially a trans structure and are highly crystalline, it was found that the homopolymers may be insoluble in any of the above-mentioned solvents. The insolubility is due to the high degree of crystallinity. The trans-polypentenamers as well as the cis-pentenamers are in general insoluble in solvents including the alcohols e.g. methanol and ethanol, the glycols, e.g. ethylene glycol, the aliphatic ketones e.g. acetone and are only partially soluble in ether.

It was found, moreover, that the homopolymers of this invention often lose their solubility properties within a short period of time due to cross-linking of the double bonds in the macromolecular chains. This cross-linking is particularly favored by the presence of catalyst residues, by high temperatures, or exposure of the polymer to air, oxygen, or light. Thus, if the homopolymers are purified by having the catalyst residues removed they can be subjected to light, air or oxygen and still maintain their stability. It appears that the purified homopolymers may undergo some cross-linking only after having been exposed to air, oxygen or light for long periods of time. In addition, small amounts of antioxidants such as phenyl-beta-naphthylamine or hydroquinone prevent cross-linking and thus stabilize the polymer against light, and other atmospheric conditions. The amount of antioxidant to be used will range from about 1 to 5 parts by weight per thousand parts by weight of polymer.

Homopolymers which have essentially a regular steric structure, and more specifically those polymers wherein the double bonds have essentially a cis or essentially a trans structure, can be characterized by an infrared absorption spectra. By the spectra it is possible to attribute a specific chemical structure to the two different types of homopolymers. In the one case the homopolymers have essentially the structure of a cis-polypentenamer and in the other case they have essentially the structure of a trans-polypentenamer.

Figure 2:
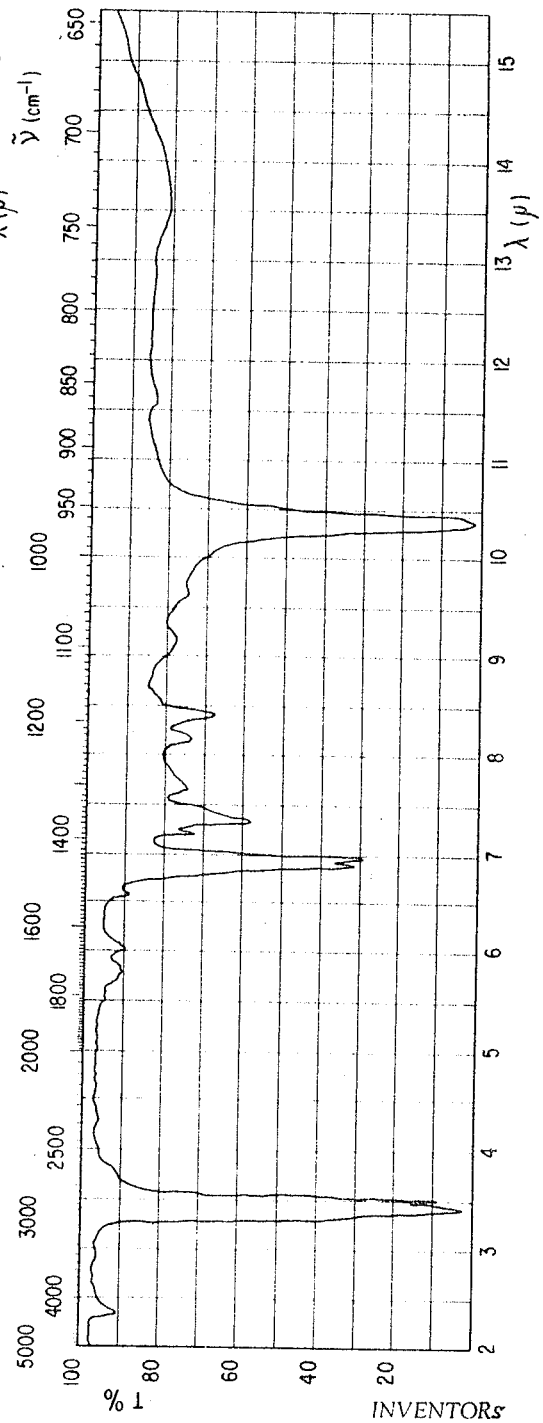

FIGURES 1 and 2 are examples of the infrared absorption spectra of the above-mentioned types of cyclopentene homopolymers. FIGURE 1 represents the infrared spectrum of an essentially linear homopolymer having an essentially cis structure (band at 13.8–13.9 microns). The double bonds of the monomeric units are derived from cyclopentene by the opening of the ring. FIGURE 2 represents the infrared spectrum of an essentially linear polymer having an essentially trans structure (band at 10.35 microns). The double bands of the monomeric units are derived from cyclopentene by the opening of the ring.

It should be noted that neither type of polymer having the infrared spectra as reported in FIGURES 1 and 2, contains bands of any appreciable intensity attributable to a cyclic structure. These bands should appear at 3.78 microns and in the zone of 8.0–8.5 microns. The homopolymers having an essentially linear and stereoregular structure appear to be amorphous some of the time and at other times crystalline as determined by X-ray examination. However, particularly in the case of homopolymers whose double bonds have an essentially trans structure, it is possible to crystallize the initially obtained amorphous homopolymers by means of a thermo or mechanical treatment. These treatments include, for example, annealing in low-boiling solvents, stretching of the fibers or films, or slow cooling of the molten polymer. These homopolymers, particularly those having an essentially trans structure, have X-ray diffraction patterns that reveal the presence of a crystalline phase which is attributable to a linear sterically-ordered structure of the type represented in Formula 1.

Thus, for instance, in the case of cyclopentene homopolymers (which have the structure of a trans polypentenamer as determined by the infrared absorption spectrum) particularly clear X-ray diffraction spectra were obtained at low temperatures on powders and stretched fibers. In the X-ray diffraction spectra, the main diffraction bands corresponded to the following lattice distances and had the following relative intensities (s.=strong, w.=weak, v.w.=very weak): 4.15 A (s.); 3.85 A (w.); 3.63 A (w.); 2.51 A (v.w.); 2.15 A (w.) (diffused band).

The identity period (period of crystallographic repetition) along the fibers axis of this particular stereoregular polymer was 11.9±0.2 A. Homopolymers of this type, wherein the double bonds were essentially all cis, generally appeared amorphous at room temperature in the unstretched state. The homopolymers can be further characterized in that they can be vulcanized because of the presence of a number of double bonds in the polymeric chain. The rate of cross-linking, during vulcanization, and the degree of cross-linking depends mainly on the type and amount of vulcanizing agent used. All of the conventional vulcanization agents and methods used for vulcanizing natural and synthetic rubber may be used for the polymers of this invention. More particularly, the vulcanization agents used for polymers built up of conjugated dienes such as sulfur and other known accelerators can be adopted for vulcanizing the homopolymers of cyclopentene.

The catalysts to be used in the homopolymerization process of this invention are prepared by mixing certain transition metal salts with specific oragnometallic compounds or metal hydrides. The transition metal salts are salts of metals belonging to Groups IV–B and VI–B of Mendeleeff's Periodic Table. More particularly, the catalysts include salts of titanium, zirconium, molybdenum and tungsten. It is preferred to use those salts where the metal is in a high valence state. Typical examples of homopolymerization are the organometallic compounds and the metal hydrides of metals such as lithium, sodium, potassium, beryllium, magnesium, calcium, zinc, cadtransition metal salts to be used for the preparation of catalyst for this invention include:

$TiCl_4$, $TiBr_4$, $TiI_4$, $TiCl_3$, $TiO(acetylacetonate)_2$, $ZrCl_4$, $ZrBr_4$, $MoCl_5$, $MoF_6$, $MoF_5Cl$, $MoO_2(acetylacetonate)_2$, $MoCl_2(phenolate)_3$, $WCl_5$ and $WCl_6$. Of the many salts applicable the preferred ones are the salts of molybdenum, zirconium and tungsten which includes:

$TiCl_4$, $TiBr_4$, $TiCl_3$, $ZrCl_4$, $MoCl_5$, $MoF_5Cl$, $MoO_2(acetylacetonate)_2$, $MoCl_2(phenolate)_3$ and $WCl_6$.

Of the salts mentioned, the molybdenum and tungsten halides have been found to give a high rate of homopolymerization and a high conversion of the cycloolefins to polymer. In addition, these catalysts produce a product having a high degree of stereospecifity which property is also exhibited by such compounds as $TiCl_4$, $TiBr_4$, $TiCl_3$, $ZrCl_4$, $MoO_2(acetylacetonate)_2$ and $MoCl_2(phenolate)_2$.

The organometallic compounds and metal hydrides which are used in combination with the transition metal compounds in preparing the catalyst used in practicing this invention include compounds of metals selected from Groups I-A, II and III of Mendeleeff's Periodic Table. Of these, the compounds particularly preferred for the mium, and aluminum. Typical examples which illustrate the various organometallic compounds and metal hydrides to be used in the preparation of the catalyst system include: Li n-$C_4H_9$, $LiC_6H_5$, $LiAlH_4$, Na n-$C_8H_{17}$, $Be(C_2H_5)_2$, BeCH₃Cl, Mg(C₂H₅)₂, Mg(C₆H₅)₂, MgC₆H₅Br, CaH₂, CaHC₂H₅, Zn(C₂H₅)₂, ZnC₂H₅Cl, Cd(C₂H₅)₂, Al(C₂H₅)₃, Al(i-C₄H₉)₃, Al(n-C₆H₁₃)₃, Al(C₆H₅)₃, Al(C₂H₅)₂Cl, Al(C₂H₅)Cl₂, Al(C₂H₅)₂F, Al(C₂H₅)₂Br, AlH(i-C₄H₉)₂, AlH₃, Al(isopropenyl)₃, Al(C₂H₅)₂OC₂H₅ and AlC₂H₅(OC₂H₅)₂

In addition, the organometallic compounds may be complexed with electron-donor compounds which include ethers, amines, phosphines, "onium" salts or alkaline halides. Particularly outstanding results were obtained by using organometallic aluminum compounds including Al(C₂H₅)₃, Al(i-C₄H₉)₃, Al(n-C₆H₁₃)₃, Al(C₂H₅)₂Cl, and other compounds such as Be(C₂H₅)₂ and Li n-C₄H₉. Although the molar ratio of the transition metal salt to the organometallic or metal hydride compound is not a limiting parameter, it is preferred that the ratio of the transition metal salt to the organometallic or metal hydride range from about 1 to 0.1 and 1 to 100.

In those instances where the organometallic or metal hydride have a lower alkylating power, it is preferred to use higher molar ratios of the two catalysts components. Compounds coming within this category include Al(C₂H₅)₂Cl Al(C₂H₅)Cl₂, Al(C₂H₅)₂Br, AlH(i-C₄H₉)₂, BeCH₃Cl, etc. With these compounds good results have been obtained by operating with molar ratios ranging between 1 to 3 and 1 to 20. However, when the organometallic or metal hydride compound has a higher alkylating power, it is preferred to use the two compounds at a lower molar ratio. Compounds coming within this category include Al(C₂H₅)₃, Al(n-C₆H₁₃)₃

Be(C₂H₅)₂, etc. With these compounds it was found that good results could be obtained by operating with molar ratios ranging from 1 to 0.5 and 1 to 5.

The relative amount of the transition metal compound to be used with the cyclopentene can be chosen in wide limits. It was found that the molar ratio of the transition metal salt to the cyclopentene is used preferably in an amount ranging from 1:10 to 1:5000.

The stereoregularity of the polymerization, i.e. the measure by which polypentenamers containing cis or trans double bonds were obtained. Illustrations of these molybsively on the transition metal compound used. When, for example, derivatives of molybdenum were used it was found that polypentenamers having prevailingly cis double bonds were obtained. Illustrations of these molybdenum derivatives include catalytic systems prepared from MoCl₅+Al(C₂H₅)₃, MoCl₅+Al(n-C₆H₁₃)₃, MoCl₅+Al(C₂H₅)₂Cl, MoCl₅+AlH(i-C₄H₉)₂
and MoO₂(acetylacetonate)₂+Al(C₂H₅)₃

On the other hand, highly stereoregular polypentenamers, wherein the double bonds are essentially all cis, were obtained when the catalyst was prepared from compounds such as molybdenum pentachloride and aluminum trialkyls. The compounds include Al(C₂H₅)₃ and Al(n-C₆H₁₃)₃

In this particular case the number of cis double bonds exceeded 95% of the entire double bond content. The stereospecificity may be also increased by using higher monomer to molybdenum salt ratios. Thus, for example, a polypentenamer was obtained which had a cis-double bond content as high as 97–98% with respect to the total double bond content. The catalyst used consisted of MoCl₅+Al(C₂H₅)₃ wherein the molar ratio of Mo/Al =1:2.5 with the cyclopentene/MoCl₅ molar ratio being 1000:1. When the catalytic system contained a transition metal such as tungsten, titanium or zirconium and an organometallic compound such as an aluminum organo compound, highly stereoregular trans-polypentenamers were obtained which had a trans-double bond content exceeding 95% of the total number of double bonds.

The catalytic systems which are particularly useful for the preparation of trans-polypentenamers having a high steric purity include such systems as WCl₆+Al(C₂H₅)₃, WCl₆+Al(C₂H₅)₂Cl, TiCl₄+Al(C₂H₅)₃ and ZrCl₄+Al(C₂H₅)₃

When employing these catalytic systems, the number of trans double bonds in the polypentenamers generally ranges from about 95% to 99% of the total.

There are, however, other catalytic mixtures which do not follow the above-described scheme. Thus, for example, some catalytic systems prepared from certain tungsten salts and the organometallic compounds induce the polymerization of cyclopentene to polypentenamers which contain prevailingly cis double bonds e.g. a catalysts prepared from WCl₆+Be(C₂H₅)₂. Conversely, catalysts prepared from certain molydenum salts induce the polymerization of cyclopentene to polypentenamers containing prevailingly trans double bonds e. g. a catalyst prepared from MoCl₂(phenoxide)₃+Al(C₂H₅)₂Cl, wherein the Mo/Al molar ratio is 1 to 5.

The above-mentioned catalytic systems prepared from a transition metal salt and an organometallic or metal hydride compound should be prepared just prior to the polymerization, at a temperature which is equal to or lower than the polymerization reaction temperature. The preparation of the catalytic systems can be carried out in the presence of an inert diluent such as, for example, an aliphatic, cycloaliphatic or aromatic hydrocarbon. Diluents of this type include n-haptane, n-pentane, petroleum ether, cyclohexane, benzene, toluene, etc.

It is possible to conveniently use only small amounts of these inert diluents where necessary. However, in many cases it is convenient to avoid the use of an inert diluent and to carry out the preparation of the catalyst in the presence of the monomer at a temperature lower than or equal to the polymerization temperature. Thus, it is possible to avoid the amount of time lost between the preparation of the catalyst and its addition to the monomer and the dilution of the catalyst mixture with the inert medium. By operating in the above manner, it is possible to obtain a higher rate of homopolymerization and thus a higher conversion of monomer into polymer.

A preferred embodiment includes, for example, holding the monomer under nitrogen and in the absence of humidity at a temperature preferably lower than or equal to the polymerization temperature, but preferably not higher than 30° C. The transition metal salt is introduced then with the addition of the organometallic or metal hydride compound while vigorously agitating the mixture. Upon adding the catalyst to the monomer, polymerization is started immediately. It is possible also to carry out the polymerization at a temperature higher than the temperature used in preparing the catalyst. The catalyst may be used by simply mixing it with the reaction components as stated above, or after it has first been applied to a support. The preferred supports include metal oxides which cannot be chemically modified. Of the metal oxides known, alumina is particularly suitable as a support for the catalyst.

With respect to the diluents, it is necessary to use an inert diluent in the polymerization and many of the above-mentioned hydrocarbons were found to be satisfactory. However, it may be preferred in some instances to avoid the use of diluents and to carry out the polymerization by using the monomer per se as a diluent.

The homopolymerization reaction may take place at temperatures ranging from about −80° C. to +100° C. and more preferably between −80° C. and +60° C. It was found that particularly good results were obtained at temperatures ranging from about −80° C. to +30° C. The polymerization reaction may be carried on until almost all of the monomer is completely polymerized. However, since cross-linking is favored which thus renders the polymer substantially insoluble, it is advisable to stop the polymerization as soon as the conversion reaches 20–50%. The remaining unpolymerized monomer can be used over again. For this reason, it is preferred to carry out the polymerization continuously by separating the polymer and recycling the monomer, possibly after further additions of the catalyst. The polymerization time, e.g. time to obtain a monomer conversion of about 20%, will vary depending upon whether or not a diluent was used, on the particular catalyst, and on the polymerization temperature. In general, the polymerization time may range from less than 30 minutes to a period in excess of ten hours.

Particularly high polymerization rates have been obtained by using as the transition metal compound a high valency halide of molybdenum or tungsten without the use of a diluent.

The nature of mechanism of the catalyst used in preparing the homopolymers of this invention has not been completely understood. It has been found, however, that a polymerization carried out with only a catalytic complex having a cationic-polymerization mechanism e.g. either titanium tetrachloride, or aluminum monoethyl dichloride could not be used for polymerizing cyclopentene. Likewise, a catalyst system having the capacity of forming free radicals at relatively low temperatures, e.g. systems containing cupric chloride and triethyl aluminum in n-heptane, was found also inoperable for the polymerization of cyclopentene. Thus, it may be concluded that the catalyst systems of this invention cannot be considered as being cationic or free radical forming.

Since it is known that the organometallic and metal hydride compounds of this invention are sensitive to oxygen, carbon dioxide, water, and other atmospheric re-agents, it is necessary to carry out the polymerization under a nitrogen atmosphere. Likewise, other operations such as the handling and preparation of the catalytic mixture should also be carried out under dry nitrogen. The homopolymers of this invention have various applications in a number of different areas which include, for example, elastomers, rubbers, expanded materials and thermosetting resins.

The following examples are illustrations of this invention and are not intended to be limiting.

Example 1

The polymerization vessel consists essentially of a flask provided with an agitator, a nitrogen inlet tube and an inlet tube for reactants.

A dry nitrogen atmosphere was formed in the flask and 10 cc. (7.7 g.) of chromatographically pure cyclopentene were introduced. In a separate flask, kept under dry nitrogen, a catalytic mixture was prepared as follows. About 3.6 millimols of molybdenum pentachloride were dissolved in 30 cc. of anhydrous n-heptane cooled to −30° C. About 9 millimols of aluminum trihexyl were then slowly added to the mixture while agitating by means of a magnetic agitator. The catalytic mixture was siphoned, under nitrogen pressure, into the polymerization flask kept at −30° C. The flask was closed and the mixture was agitated at −30° C. for 20 hours. The Al/Mo molar ratio was 2.5:1 and the monomer/Mo molar ratio was about 30:1.

About 5 cc. of n-butanol and 20 mg. of phenyl-beta-naphthylamine were added and the reaction mixture was poured into 200 cc. of methanol which contained 5 cc. of 38% hydrochloric acid.

The polymer was precipitated and dried under nitrogen and then dissolved again in 50 cc. of methanol which contained 2 cc. of 38% hydrochloric acid and 20 mg. of phenyl-beta-naphthylamine. The mother liquor was decanted, the polymer was suspended in fresh methanol, the suspension was filtered and then the polymer was washed further with methanol and then finally dried under reduced pressure at room temperature. About 2.1 g. (corresponding to a conversion of 27%) of an elastic non-tacky polymer were obtained. It had an intrinsic viscosity as determined in toluene at 30° C. of 0.6 (100 ml./g.). The polymer appeared to be soluble in aliphatic cycloaliphatic, aromatic and chlorinated hydrocarbons and insoluble in the lower alcohols and in acetone. The polymer had an infrared absorption spectrum from which was evident the presence of approximately one cis double bond (bands at 7.10 and 13.9 microns) per each monomeric unit and almost complete absence of other types of double bonds (trans, vinyl, vinylidene, conjugated or cumulated double bonds). Cyclic structures, methyl groups and long methylenic sequences were also absent. The polymer obtained had a structure of a polypentenamer.

Example 2

In the polymerization of cyclopentene, the preparation of the catalyst and the purification of the polymer were carried out as described in Example 1.

The catalytic mixture, however, instead of being prepared from n-heptane, molybdenum pentachloride and aluminum tri-n-hexyl, was prepared by using 30 cc. of anhydrous toluene, 3.6 millimols of molybdenyl diacetylaceonate and 18 millimols of aluminum dietyl monochloride. The polymerization time was 20 hours and the polymerization temperature was −30° C. The Al/Mo molar ratio was 5:1 and the monomer/Mo molar ratio was about 30:1.

About 1.5 g. (corresponding to a conversion of 20%) of a scarcely tacky polymer were obtained. The infrared absorption spectrum of this polymer showed the presence of almost equivalent amounts of double bonds of the cis and the trans type. There was no indication of cyclic structures of methyl groups or of long methylenic sequences.

Figure 3:
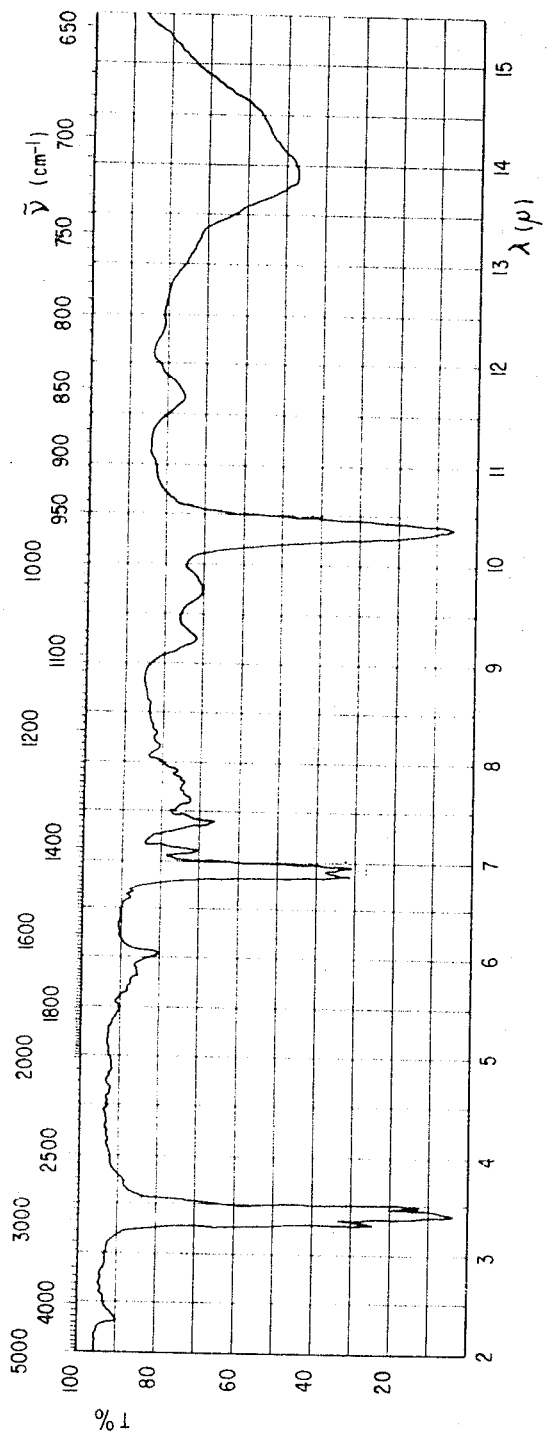

The polymer had the structure of a polypentenamer with cis and trans double bonds. The intrinsic viscosity of the polymer, determined in toluene, at 30° C., was 1.2 (100 ml./g.). The infrared absorption spectrum of the polymer is shown in FIGURE 3.

Example 3

The polymerization of cyclopentene, the preparation of the catalyst and the purification of the polymer were carried out as described in Example 1.

The catalytic mixture was separately prepared from 30 cc. of toluene, 3.6 millimols of molybdenum dichloride-triphenolate and 18 millimols of aluminum diethyl monochloride. The polymerization time was 20 hours and the polymerization temperature was −30° C. The Al/Mo molar ratio was 5:1 and the monomer/Mo molar ratio was about 30:1.

About 0.7 g. (corresponding to a conversion of 9%) of an elastic non-tacky polymer were obtained. The polymer was soluble in aromatic, cycloaliphatic, aliphatic and chlorinated hydrocarbons, but insoluble in lower alcohols, in lower glycols and in acetone. The polymer had an intrinsic viscosity [η], determined in toluene at 30° C., of 0.4 (100 ml./g.).

It had an infrared absorption spectrum from which was evident the presence of approximately one trans double bond (band at 10.35 microns- per each monomeric unit. There was, however, almost a complete absence of cyclic structures, of other double types of bonds, of methyl groups and of long methylenic sequences. The polymer essentially had the structure of a trans polypentenamer.

Example 4

The polymerization vessel consisted of a flask of the type described in Example 1. The preparation of the catalytic mixture was carried out directly in this flask. After the formation of an inner atmosphere of dry nitrogen, 20 cc. (15.4 g.) of anhydrous cyclopentene and, after cooling to −30° C., 3.6 millimols of molybdenum pentachloride were introduced.

About 9 millimols of aluminum tri-n-hexyl were then added to the mixture while vigorously agitating. The Al/Mo molar ratio was 2.5:1. The monomer/Mo molar ratio was about 60:1.

The polymerization started immediately and the solution became more and more viscous and then assumed a gelly consistency.

The polymerization was stopped after 2 hours by adding 5 cc. of n-butanol containing 20 mg. of phenyl-beta-naphthylamine. The polymer formed was dissolved under nitrogen in 100 cc. of toluene cooled to 0° C. After repeated filtrations, the toluene solution was poured into 500 cc. of methanol containing 10 cc. of 38% hydrochloric acid.

The polymer was precipitated, dried under nitrogen and then dissolved in 100 cc. of benzene. The solution was filtered and poured into 500 cc. of methanol, containing 10 cc. of 30%-hydrochloric acid and 20 mg. of phenyl-beta-naphthylamine. The mother solution was decanted. The polymer was suspended in fresh methanol, filtered, washed further with methanol and finally dried under reduced pressure at room temperature.

About 5.8 g. (corresponding to a conversion of 37%) of an elastic non-tacky polymer were obtained. It had an intrinsic viscosity determined in toluene at 30° C. of 1.4 (100 ml./g.), and had solubility properties very similar to those of the polymer described in Example 1. The polymer had an infrared absorption spectrum from which was evident the presence of approximately one double bond per each monomeric unit. The double bonds were prevailingly (about 70-80%) of cis type and in a lower proportion (about 20-30%) of the trans type.

The bands characteristic of other possible types of double bonds e.g. vinyl, vinylidene, conjugated or cumulated double bonds, cyclic structures, methyl groups and long methylenic sequences were absent.

The polymer obtained essentially had the structure of a polypentenamer with prevailing cis double bonds and with a lower porportion of trans double bonds.

Example 5

The polymerization of cyclopentene was carried out as described in Example 4, with the variation that 1.5 millimols (instead of 3.6 millimols) of molybdenum pentachloride and 3.75 millimols of aluminum triethyl (instead of 9 millimols of aluminum tri-n-hexyl) were used for the preparation of the catalytic mixture. The Al/Mo molar ratio was 2.5:1. The monomer/Mo molar ratio was about 150:1. The polymerization of cyclopentene was carried out at −30° C. for 3 hours.

The polymer thus obtained was purified as described in Example 4. About 3.3 g. (corresponding to a conversion of 21%) of an elastic polymer were isolated. It had an intrinsic viscosity, determined in toluene, at 30° C., of 0.9 (100 ml./g.). It had solubility properties very similar to those of the polymer described in Example 1. The polymer had the infrared absorption spectrum shown in FIGURE 1. It appears from the spectrum that there was approximately one double bond of the cis type (about 95%) per each monomeric unit. Double bonds of other types e.g. vinyl, vinylidene, conjugated or cumulated were essentially absent. Except for the trans double bonds (about 5%), cyclic structures, methyl groups, and long methylenic sequences were also absent.

The polymer obtained substantially had the structure of a cis polypentenamer. The polymer was vulcanized for 60 minutes at 150° C. with a mix consisting of:

| | Parts by wt. |
|---|---|
| Polymer | 100 |
| Sulfur | 1.75 |
| Vulca for HBS | 1.0 |
| ZnO | 5.0 |
| Stearic acid | 1.0 |

The vulcanized product was a rubber having physical and mechanical properties similar to those of natural rubber.

Example 6

The polymerization of cyclopentene was carried out as described in Example 4, with the following amounts of monomer and catalyst components:

| | |
|---|---|
| Anhydrous cyclopentene (7.7 g.) cc__ | 10 |
| of molybdenum dichloride triphenolate millimols__ | 4 |
| Aluminum diethyl monochloride do____ | 10 |

The polymerization was started at −30° C. After 3 hours the reaction mixture was heated to room temperature and was kept at this temperature for 4 hours. The Al/Mo molar ratio was 2.5:1. The monomer/Mo molar ratio was about 30:1.

The polymer was purified as described in Example 4. About 0.4 g. (corresponding to a conversion of 5%) of a rubbery non-tacky polymer was isolated. The polymer had an intrinsic viscosity, determined in toluene at 30° C., of 0.7 (100 ml./g.), and solubility properties very similar to those of the polymer described in Example 1.

From the infrared absorption spectrum of the polymer, the presence of double bonds was evident. The bonds were essentially only of the trans type (more than 98%), in an amount of about one trans double bond per each monomeric unit. Double bonds of other types e.g. cis, vinyl, vinylidene, conjugated and cumulated were essentially absent. The cyclic structures, methyl groups and long methylenic sequences were also absent.

The polymer obtained essentially had the structure of a trans polypentenamer.

Example 7

The polymerization of cyclopentene was carried out as described in Example 4, by using the following amounts of monomer and components of the catalytic mixture:

| | |
|---|---|
| Anhydrous cyclopentene (7.7 g.) cc__ | 10 |
| Molybdenum pentafluoride monochloride [1] millimols__ | 4 |
| Aluminum triethyl do____ | 12 |

[1] Prepared according to Italian patent application No. 26,505, filed on Aug. 22, 1962, by applicant; now Italian Patent No. 678,565.

The Al/Mo molar ratio was 3:1. The monomer/Mo molar ratio was about 30:1. The polymerization was carried out first at −30° C. for 3 hours and then at 0° C. for 14 hours. The polymer was purified as described in Example 4.

About 3.5 g. (corresponding to a conversion of 46%) of a rubbery non-tacky polymer were isolated. The polymer had an intrinsic viscosity, determined in toluene at 30° C., of 1.4 (100 ml./g.) and had solubility properties very similar to those of the polymer described in Example 6.

This polymer had the structure of an essentially trans polypentenamer (more than 95%).

Example 8

The polymerization of cyclopentene was carried out as described in Example 4, by using the following amounts of monomer and components of catalytic mixture:

| | |
|---|---|
| Anhydrous cyclopentene (15.4 g.) cc__ | 20 |
| Tungsten hexachloride millimols__ | 5 |
| Aluminum diethyl monochloride do____ | 25 |

The Al/W molar ratio was 5:1. The monomer/W molar ratio was about 50:1. The polymerization was carried out at −30° C., for 3 hours. The polymer obtained was purified as described in Example 4.

About 5.8 g. (corresponding to a conversion of 38%) of a rubbery non-tacky polymer were isolated. This polymer had an intrinsic viscosity, determined in toluene at 30° C., of 1.2 (100 ml./g.) and had properties very similar to those of the polymer described in Example 6.

The polymer had an infrared absorption spectrum very similar to that of the polymer described in Example 6. This spectrum is reported in FIGURE 2. The polymer had the structure of an essentially trans polypentenamer (more than 98% trans double bonds).

The polymer was vulcanized with the mix on the basis of sulfur and accelerator described in Example 5. The product was a rubber having the following characteristics:

| | |
|---|---|
| Tensile strength _____kg./cm.² __ | 35 |
| Elongation at break _____percent __ | 700 |
| Modulus at 300% _____kg./cm.² __ | 9 |

The addition of carbon black to the vulcanization mix gave products having a higher modulus of elasticity and a higher tensile strength.

The polymer, without any pre-treatment especially at lower temperatures, had an X-ray diffraction spectrum (powder spectrum) which was characteristic of crystalline substances. In the state of a stretched fiber, the polymer appeared to be highly crystalline. This oriented fiber spectrum gave the main diffraction spots at the following lattice distances and with the following relative intensities (s.=strong; w.=weak; v.w.=very weak): 4.15 A. (s.); 3.85 A. (w.); 3.63 A. (w.); 2.51 A. (v.w.); 2.15 A. (w.) (diffused band).

The identity period (crystallographic repetition period) along the fiber axis of this particular stereoregular polymer was 11.9±0.2 A.

Example 9

The polymerization of cyclopentene was carried out as described in Example 4, by using the following amounts of monomer and component of the catalytic mixture:

| | |
|---|---|
| Anhydrous cyclopentene (7.7 g.) _____cc __ | 10 |
| Tungsten hexachloride _____millimols __ | 4 |
| Aluminum triethyl _____do ____ | 12 |

The Al/W molar ratio was 3:1. The monomer/W molar ratio was about 30:1. The polymerization was carried out first at −30° C. for 3 hours and then at 0° C. for 12 hours. The polymer was purified as described in Example 4. About 3.8 g. (corresponding to a conversion of 49%) of a rubbery non-tacky polymer were isolated.

It had an intrinsic viscosity, determined in toluene at 30° C., of 1.2 (100 ml./g.) and properties very similar to those of the polymer described in Example 8. Like said polymer, it had an infrared absorption which was characteristic of a polymer having essentially the structure of a trans polypentenamer, and an X-ray diffraction spectrum characterized by the presence of spots as specified for the polymer of Example 8. The polymer was vulcanized with the mixture on the bases of sulfur and accelerator, described in Example 8.

Example 10

The polymerization of cyclopentene was carried out as described in Example 4, by using the following amounts of monomer and components of catalytic mixture:

| | |
|---|---|
| Anhydrous cyclopentene (7.7 g.) _____cc __ | 10 |
| Zirconium tetrachloride _____millimols __ | 4 |
| Triethyl aluminum _____do ____ | 12 |

The Al/Zr molar ratio was 3:1. The monomer/Zr molar ratio was about 30:1. The polymerization was carried out first at −30° C. for 4 hours and then at 0° C. for 12 hours.

After purification of the polymer as described in Example 4, about 0.2 g. (corresponding to a conversion of 3%) of a waxy polymer was isolated.

The polymer had an intrinsic viscosity, determined in toluene at 30° C., of 0.3 (100 ml./g.) and properties very similar to those of the polymer described in Example 8. It had an infrared absorption spectrum which is a characteristic of a polymer having essentially the structure of a trans polypentenamer (more than 98% of trans double bonds.)

It appeared to be crystalline from the X-ray diffraction pattern obtained on powders. The crystallinity bands are the same as described in the case of the polymer of Example 8.

Example 11

The polymerization of cyclopentene was carried out as described in Example 4, by using the following amounts of monomer and components of catalytic mixture:

| | |
|---|---|
| Anhydrous cyclopentene (7.7 g.) _____cc __ | 10 |
| Titanium tetrachloride _____millimols __ | 1.8 |
| Aluminum triethyl _____do ____ | 4.5 |

The Al/Ti molar ratio was 2.5:1. The monomer/Ti molar ratio was about 60:1. The polymerization was carried out first at −30° C. for 2 hours and then at room temperature for 10 hours.

After purification of the polymer as described in Example 4, about 0.2 g. (corresponding to a conversion of 3%) of a waxy polymer having an intrinsic viscosity, determined in toluene at 30° C., of 0.3 (100 ml./g.), were isolated. It had properties very similar to those of the polymer of Example 8. It had an infrared absorption spectrum (see FIGURE 2) which is characteristic of a polymer essentially having the structure of a trans polypentenamer (more than 98% trans double bonds). The polymer appeared to be crystalline by X-ray examination. The crystallinity bands were the same as described in the case of the polymer of Example 8.

Example 12

The polymerization of cyclopentene was carried out as described in Example 4, by using the following amounts of monomer and components of catalytic mixture:

| | |
|---|---|
| Anhydrous cyclopentene _____cc __ | 10 |
| "Solid solution" pre-activated by heating and grinding and consisting of 3 parts by mols of titanium trichloride and 1 part by mols of aluminum trichloride _____millimols __ | 4 |
| Aluminum triethyl _____do ____ | 10 |

The Al-alkyl/Ti molar ratio was 3.3:1. The monomer/Ti molar ratio was about 40:1. The polymerization was carried out at +45° C. for 22 hours. After purification of the polymer as described in Example 4, about 0.2 g. (corresponding to a conversion of 3%) of a powdery polymer was isolated. The infrared absorption spectrum made it possible to determine that the polymer consisted of a mixture of crystalline polyethylene (formed by decomposition of the catalyst) and of a trans polypentenamer.

Example 13

The polymerization of cyclopentene was carried out as described in Example 4, by using the following amounts of monomer and components of catalytic mixture:

| | |
|---|---|
| Anhydrous cyclopentene (7.7 g.) _____cc __ | 10 |
| Titanium tetrabromide _____millimols __ | 4 |
| Aluminum triethyl _____do ____ | 10 |

The Al/Ti molar ratio was 2.5:1. The monomer/Ti molar ratio was about 30:1.

The polymerization was carried out first at −30° C. for 7 hours and then at 0° C. for 14 hours.

After purification of the polymer as described in Example 4, about 0.2 g. (corresponding to a conversion of 3%) of a powdery polymer was isolated.

The infrared absorption spectrum made it possible to determine that it consisted of a mixture of crystalline polyethylene (formed by decomposition of the catalyst) and of a polypentenamer.

Example 14

The polymerization of cyclopentene was carried out as described in Example 4, by using the following amounts of monomer and components of catalytic mixture:

| | |
|---|---|
| Anhydrous cyclopentene (7.7 g.) cc | 10 |
| Molybdenum pentachloride millimols | 2 |
| Aluminum triethyl do | 5 |

The Al/Mo molar ratio was 2.5:1. The monomer/Mo molar ratio was abount 50:1. The polymerization was carried out at −78° C. for 3 hours.

After purification of the polymer as described in Example 4, about 4.0 g. (corresponding to a conversion of 52%) of a rubbery non-tacky polymer having properties similar to those of the polymer described in Example 4 were isolated. Its infrared absorption spectrum made it possible to determine that the polymer had essentially the structure of polypentenamer (according to the aforementioned nomenclature of M. L. Higgins), wherein the double bonds are prevailingly (about 80%) of the cis type and a lower proportion (about 20%) of the trans type. The polymer had an intrinsic viscosity, determined in toluene at 30° C. of 0.4 (100 ml./g.). It was easily vulcanized by operating according to the method of Example 5.

Example 15

The polymerization of cyclopentene was carried out as described in Example 4, by using the following amounts of monomer and components of catalytic mixture:

| | |
|---|---|
| Anhydrous cyclopentene (7.7 g.) cc | 10 |
| Molybdenum pentachloride millimols | 2 |
| Aluminum di-isobutyl monohydride do | 6 |

The Al/Mo molar ratio was 3:1. The monomer/Mo molar ratio was about 40:1.

The polymerization was carried out at −78° C. for 10 hours. After purification of the polymer as described in Example 4, about 2.8 g. (corresponding to a conversion of 36%) of a partially cross-linked polymer were isolated. Its infrared absorption spectrum made it possible to establish that the polymer had essentially the structure of a polypentenamer wherein the double bonds were of the cis and trans type.

Example 16

The polymerization of cyclopentene was carried out as described in Example 4, by using the following amounts of monomer and components of catalytic mixture:

| | |
|---|---|
| Anhydrous cyclopentene (7.7 g.) cc | 10 |
| Tungsten hexachloride millimols | 2 |
| Diethyl beryllium do | 6 |

The Al/W molar ratio was 3:1. The monomer/w ratio was about 60:1. The polymerization was carried out at −30° C. for 22 hours.

After purification of the polymer described in Example 4, about 1 g. (corresponding to a conversion of 13%) of a rubbery non-tacky polymer having properties similar to those of the polymer described in Example 4, was isolated. Its infrared absorption spectrum made it possible to establish that the polymer had essentially the structure of a polypentenamer wherein the double bonds are prevailingly (about 70%) the cis type and a minor proportion (about 30%) the trans type.

Example 17

The polymerization of cyclopentene was carried out as described in Example 4, by using the following amounts of monomer and a catalytic mixture:

| | |
|---|---|
| Anhydrous cyclopentene (7.7 g.) cc | 10 |
| Tungsten hexachloride millimols | 2 |
| Lithium n-butyl do | 6 |

The Al/W molar ratio was about 60:1. The monomer/W molar ratio was about 60:1. The polymerization was carried out at −30° C. for 90 minutes and then at room temperature for 5 hours. After purification of the polymer as described in Example 4, about 0.1 g. (corresponding to a conversion of 1.5%) of a fluffy polymer, having properties similar to those of the polymer described in Example 4, was isolated. Its infrared absorption spectrum made it possible to establish that it essentially had the structure of a polypentenamer wherein the double bonds were of the cis and trans type almost in the same proportions.

Example 18

The polymerization of cyclopentene was carried out as described in Example 4, by using the following amounts of monomer and components of catalytic mixture:

| | |
|---|---|
| Anhydrous cyclopentene (7.7 g.) cc | 10 |
| Molybdenum pentachloride millimols | 0.11 |
| Aluminum triethyl do | 0.28 |

The Al/Mo molar ratio was 2.5:1. The monomer/Mo molar ratio was about 1000:1. The polymerization was carried out at −30° C. for 6 hours. After purification as described in Example 4, about 1.5 g. (corresponding to a conversion of 19%) of the polymer were obtained. It was a solid rubberlike mass. It was soluble in hydrocarbons e.g. benzene and n-heptane, chlorinated hydrocarbons e.g. carbon tetrachloride and in many other solvents. It was insoluble in alcohols e.g. methanol, ketones e.g. acetone and partially in ethers e.g. diethylether.

The infrared absorption spectrum indicated a cis double bond content of 97–98%. Other types of double bonds were essentially absent. The polymer was a cis polypentenamer with a high stereoregularity.

Example 19

The polymerization of cyclopentene was carried out as described in Example 4, by using:

| | |
|---|---|
| Anhydrous cyclopentene (7.7 g.) cc | 10 |
| Molybdenum pentachloride millimols | 0.28 |
| Aluminum tri-n-hexyl do | 2.8 |

The Al/Mo molar ratio was 10:1. The monomer/Mo molar ratio was about 400:1. The polymerization was carried out at −30° C. for 3 hours. After purification as described in Example 4, about 0.8 g. (corresponding to a 10% conversion) of the polymer was obtained. It was a solid rubberlike mass having properties substantially similar to those of the polymer of Example 18. Its intrinsic viscosity in toluene at 30° C. was 7.6 (100 cc./g.).

The infrared absorption spectrum indicated a cis double bond content of 95–96%. Trans double bonds were present only in small amounts (4–5%). Other types of double bonds were substantially absent. The polymer substantially had the structure of a cis polypentenamer.

Example 20

The polymerization of cyclopentene was carried out as described in Example 4, by using:

| | |
|---|---|
| Anhydrous cyclopentene (7.7 g.) cc | 10 |
| Molybdenum pentachloride millimols | 2.8 |
| Aluminum tri-n-hexyl do | 2.8 |

The Al/Mo molar ratio was 1:1. The monomer/Mo molar ratio was about 40:1. The polymerization was carried out at −30° C. for 3 hours. After purification as described in Example 4, 2.7 g. (corresponding to a conversion of 35%) of a polymer was obtained, which was a solid, rubberlike mass and which exhibited properties like those of the polymer of Example 4. Its intrinsic viscosity in toluene at −30° C. was 2.8 (100 cc./g.).

The infrared absorption spectrum indicated the polymer contained about 85% of cis and 15% of trans double bonds. Its structure was prevailingly that of a cis polypentenamer.

Example 21

The polymerization of cyclopentene was carried out as described in Example 4, by using:

| | |
|---|---|
| Anhydrous cyclopentene (30.8 g.) cc | 40 |
| Tungsten hexachloride millimols | 6.8 |
| Diethyl aluminum monochloride do | 34 |

The Al/W molar ratio was 5:1. The monomer/W molar ratio was about 67:1. The polymerization was carried out −30° C. for 9 hours. After purification as described in Example 4, about 15.0 g. (corresponding to a conversion of 49%) of a solid rubberlike polymer was obtained which had properties similar to those of the polymer of Example 8.

The infrared absorption spectrum indicated a trans double bond content of more than 98%. The structure of the polymer was essentially that of a trans polypentenamer. The polymer was vulcanized using the following mixture:

| | Parts by wt. |
|---|---|
| Trans-polypentename | 100 |
| Phenyl β-naphthylamine | 1 |
| Laurinic acid | 2 |
| Zinc oxide | 5 |
| Cyclohexyl benzathiayl naphthylamide | 1.2 |
| Sulfosan R. | 1.8 |

Vulcanization time was 40 minutes at a vulcanization temperature of 158° C.

Test of the vulcanized rubber was as follows:

| | |
|---|---|
| Tensile strength kg./cm.$^2$ | 148 |
| Elongation percent | 740 |
| Elasticity module: | |
| $E_{100\%}$ kg./cm.$^2$ | 11.1 |
| $E_{300\%}$ kg./cm.$^2$ | 15.4 |
| Shore A hardness | 51 |

While this invention has been described with respect to a number of specific embodiments, it is obvious that there are many other modifications and variations which can be made without departing from the spirit of the invention, except as more particularly pointed out in the appended claims.

What is claimed is:

1. High molecular weight homopolymers of cyclopentene, said homopolymers being characterized in having the structure of a polypentenamer in which the double bonds are substantially of the trans type, and in being crystalline under normal conditions without having been mechanically treated to induce crystallization.

2. A process for preparing high molecular weight unsaturated homopolymers of cyclopentene containing pentenameric units, which process comprises polymerizing cyclopentene at a selected temperature in the range from about −80° C. to +60° C. in the presence of an effective amount of a catalyst; said catalyst consisting essentially of the product prepared by mixing a transition metal salt of a metal selected from the group consisting of titanium, zirconium, molybdedum and tungsten and in which the transition metal is in its higher valence state and an organometallic compound of a metal selected from the group consisting of aluminum, beryllium and lithium.

3. The process of claim 2 further characterized in that the transition metal salt is a molybdenum halide.

4. The process of claim 3 further characterized in that the molybdenum halide is molybdenum pentachloride.

5. The process of claim 2 further characterized in that the transition metal salt is molybdenum diacetyl acetonate.

6. The process of claim 2 further characterized in that the transition metal salt is a tungsten halide.

7. The process of claim 6 further characterized in that the tungsten halide is tungsten hexachloride.

8. The process of claim 2 further characterized in that the titanium halide is titanium tetrachloride.

9. The process of claim 2 further characterized in that the transition metal salt is a zirconium halide.

10. The process of claim 9 further characterized in that the zirconium halide is zirconium tetrachloride.

11. The process of claim 2 further characterized in that the organometallic compound is an aluminum compound.

12. The process of claim 11 further characterized in that the aluminum organometallic compound is an aluminum trialkyl.

13. The process of claim 11 further characterized in that the aluminum organometallic compound is an aluminum dialkyl monohalide.

14. The process of claim 11 further characterized in that the aluminum organometallic compound is an aluminum dialkyl monohydride.

15. The process of claim 2 further characterized in that the organometallic compound is a beryllium dialkyl.

16. The process of claim 2 further characterized in that the organometallic compound is a lithium alkyl.

17. The process of claim 2 further characterized in that the polymerization of the cyclopentene is carried out in the presence of a catalyst consisting essentially of the product prepared by mixing tungsten hexachloride and an aluminum alkyl.

18. The process of claim 13 further characterized in that the aluminum dialkyl monohalide is an aluminum dialkyl monochloride.

19. The process of claim 2 further characterized in that the molar ratio of the transition metal salt to the organometallic compound ranges between 1 to 0.1 and 1 to 100.

References Cited

UNITED STATES PATENTS

| | | | |
|---|---|---|---|
| 3,366,616 | 1/1968 | Tietz | 260—93.1 |
| 3,330,815 | 7/1967 | McKeon et al. | 260—93.1 |

OTHER REFERENCES

W. L. Truett et al., J. Am. Chem. Soc. 82, 2337 (1960), (2337–2340).

JAMES A. SEIDLECK, Primary Examiner

M. B. KURTZMAN, Assistant Examiner

U.S. Cl. X.R.

260—93.7, 94.3